Oct. 19, 1971    N. O. BIELSTEN    3,613,442

MAGNETO-ELASTIC TRANSDUCER FOR LATERAL FORCE

Filed Dec. 4, 1969

INVENTOR.
NILS OVE BIELSTEN
BY
Jennings Bailey, Jr

United States Patent Office 3,613,442
Patented Oct. 19, 1971

3,613,442
MAGNETO-ELASTIC TRANSDUCER FOR LATERAL FORCE
Nils Ove Bielsten, Vasteras, Sweden, assignor to Allmänna Svenska Elektriska Aktiebolaget, Vasteras, Sweden
Filed Dec. 4, 1969, Ser. No. 882,263
Claim priority, application Sweden, Dec. 9, 1968, 16,783/68
Int. Cl. G01l 5/12
U.S. Cl. 73—141 A
4 Claims

ABSTRACT OF THE DISCLOSURE

A magneto-elastic force transducer formed by a laminated core of magneto-strictive material has apertures containing a flux generating winding and a measuring winding. The core is a beam fixed at one end, the other end having engagement surfaces for forces which are exerted generally perpendicular to the longitudinal direction of the beam. The apertures extend perpendicular to the longitudinal direction of the beam and of the force operating on it. The parts of the core between the aperatures have a longitudinal direction which substantially coincides with the direction of the main stresses in the shearing stress field. The beam may be provided with slots or the openings may be of enlarged generally triangular cross section in order to reduce the stiffness of the beam.

BACKGROUND OF THE INVENTION (1) Field of the invention

The present invention relates to a magneto-elastic force transducer comprising a laminated core of magneto-strictive material having a winding connected to an excitation source to generate a magnetic alternating flux in the core and having a winding connected to a measuring device to sense alterations in the flux when the transducer is subjected to a mechanical force.

SUMMARY OF THE INVENTION

According to the invention the core is constructed as a beam clamped at one end, the other end being provided with at least one engagement surface for forces which are at least substantially perpendicular to the longitudinal direction of the beam, the winding being arranged in apertures extending substantially perpendicularly to the longitudinal direction of the beam and to the direction of the operating force. The parts of the core situated between the apertures have a longitudinal direction which substantially coincides with the direction of the main stresses in the shearing stress field.

BRIEF DESCRIPTION OF THE DRAWINGS

In the accompanying drawings

DESCRIPTION OF THE PREFERRED EMBODIMENTS

The transducer according to the invention has a core of laminated magneto-strictive material and is constructed as a beam 1 clamped at one end. In all the figures the beam is assumed to be clamped at its lower end. At its upper, free end the beam has a projection 2 having two vertical side surfaces 3 and 4 against which the force to be measured can operate. This is clear from FIGS. 3 and 4. The forces to be measured influence the transducer as indicated by the arrows 5 and 6 in FIG. 1.

Figure 1:
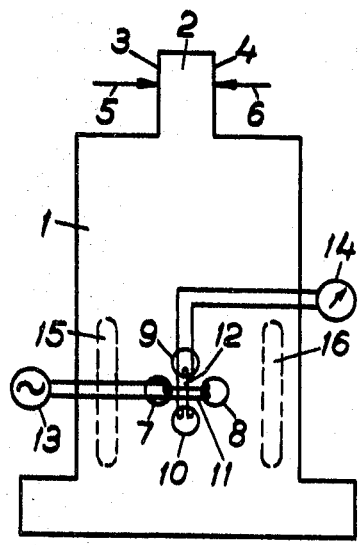
FIGS. 1 and 2 show two variants of the invention.

In the embodiment shown in FIG. 1 the beam is provided in the vicinity of its lower end with four through-holes in the form of channels 7, 8, 9 and 10, preferably with circular cross-section. A winding 11 is arranged in known manner in the channels 7 and 8 and is connected to an alternating voltage source 13 to generate a magnetic alternating flux in the region around the channels. A winding 12 is similarly arranged in the channels 9 and 10 and this is connected to a measuring device 14. In order to increase the sensitivity of the transducer the beam may be provided with two longitudinal slots 15 and 16 parallel to the longitudinal sides of the beam.

Figure 2:
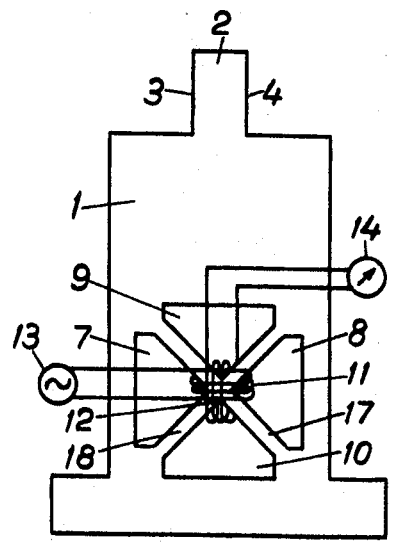

The transducer shown in FIG. 2 has apertures with larger cross-section than in the embodiment according to FIG. 1. The cross-section of the apertures is substantially triangular and one corner of each aperture faces towards one and the same point on the central axis of the beam. The parts of the core material remaining between the apertures thus have the form of two struts 17 and 18 crossing each other, the direction of these struts substantially coinciding with the direction of the main stresses into the shearing stress field. The two windings 11 and 12 are arranged in the cross between the two struts, but may of course be placed around the individual struts. Since the apertures have a relatively large cross-sectional area, a large space is obtained for the windings. Further, the material remaining at the edges of the beams has little area and the struts 17 and 18 are long and slim. All this contributes to making the transducer especially sensitive. A similar effect can of course be effected by using apertures having square, rectangular or semi-elliptical cross-section.

The apertures with the windings are arranged symmetrically about the symmetry plane of the beam and oriented so that the transducer senses principally stresses at an angle of 45° to the neutral axis of the beam, that is the main stresses in the shearing stress field. For a single-sided clamped beam loaded with a point-load at the free end, the lateral force is constant along the length of the beam, whereas the bending moment varies linearly with the distance to the pressure point. The normal stresses caused by the bending moment have very little influence on the output signal of the transducer and the transducer will therefore be insensitive to minor alterations in the pressure point, contrary to transducers with an operation based on sensing the bending stresses. The transducer is furthermore symmetrical and emits signals for both pressure directions.

Figure 3:
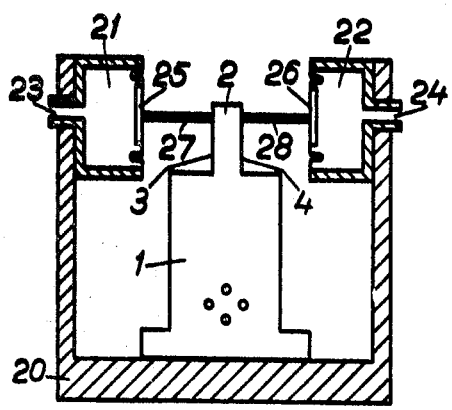
FIG. 3 shows the transducer in use as a difference pressure gauge and FIG. 4 shows the transducer in use for measuring horizontal forces in a bearing bracket.

FIG. 3 shows the transducer in use as a difference pressure gauge. A stand 20 carries two pressure chambers 21 and 22 with connection nipples 23, 24 and membranes 25, 26. A rod 27 connects the membrane 25 to the surface 3 of the projection 2 and in the same way the rod 28 connects the membrane 26 to the surface 4. The pressure in the chambers 21 and 22 influences the projection 2 with a force which in size and direction is determined by the difference between the two pressures.

Figure 4:
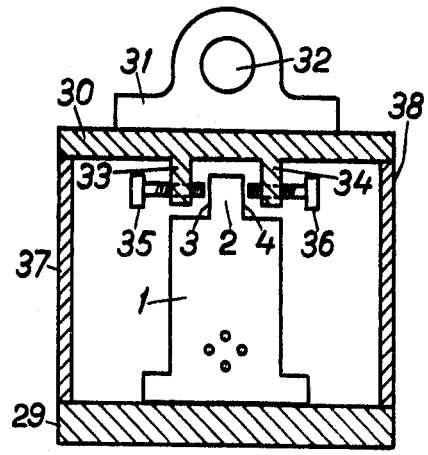

FIG. 4 shows the the transducer in use in a strip tension measuring device. The stand 29 carries a plate 30 on which is attached a bearing bracket 31 for a shaft 32. The plate is provided on its lower side with two downwardly directed ears 33, 34 having threaded holes for two screws 35, 36 which can be screwed so that they abut the surfaces 3 and 4 on the projection 2. If the shaft 32 is subjected to a horizontal force, the plate 30 will be displaced laterally together with the components attached to it, as the plate is supported by the laterally resilient supports 37 and 38 in the stand 29.

The measuring devices shown in FIGS. 3 and 4 are only to be considered as examples of how a transducer for lateral forces according to the invention can be used.

I claim:

1. Magneto-elastic force transducer for measuring mechanical forces comprising a laminated core of magnetostrictive material having apertures therein and having in said apertures a winding connected to an excitation source to generate a magnetic alternating flux in the core and having a winding connected to a measuring device to sense alterations in the flux when the transducer is subjected to a mechanical force, in which the core comprises a beam (1) fixed at one end, the other end being provided with at least one engagement surface (3, 4) for said mechanical forces which are at least substantially perpendicular to the longitudinal direction of the beam, the apertures (7, 8, 9, 10) extending substantially perpendicularly to the longitudinal direction of the beam and to the direction of the force operating thereon, and the parts of the core situated between the apertures having a longitudinal direction which at least substantially coincides with the direction of the main stresses in the shearing stress field, one of said two windings being situated in a plane parallel to the longitudinal axis of the beam and the other winding being situated in a plane perpendicular to the longitudinal axis of the beam.

2. Transducer according to claim 1, in which between the region of the beam where the apertures are located and each of the two sides of the beam which are parallel to the longitudinal direction of the beam, is a slot (15, 16) which is parallel to said sides of the beam.

3. Transducer according to claim 1, in which the core has four apertures for the windings and the apertures have at least substantially triangular cross-section with one corner of each aperture facing the same point in the neutral plane of the core.

4. In combination with a transducer according to claim 1, in which said apertures are located adjacent the fixed end of the beam, a structure responsive to a force to be measured and having means mounted responsive to such force to engage a face of said beam at a point remote from the fixed end thereof to exert a force on such face in a direction substantially perpendicular to the longitudinal axis of the beam.

References Cited

UNITED STATES PATENTS

| | | | |
|---|---|---|---|
| 2,597,751 | 5/1952 | Ruge | 73—141 |
| 2,895,332 | 7/1959 | Dahle et al. | 73—141 |
| 3,292,429 | 12/1966 | Dahle | 73—141 |
| 3,453,876 | 7/1969 | Radus | 73—141 |

FOREIGN PATENTS

| | | | |
|---|---|---|---|
| 663,541 | 5/1963 | Canada | 73—88 |
| 1,315,183 | 11/1963 | France | 601—E |
| 307,463 | 7/1969 | Sweden | 601—E |

RICHARD C. QUEISSER, Primary Examiner

J. WHALEN, Assistant Examiner

U.S. Cl. X.R.

73—133, 144; 336—20